United States Patent [19]

Tsubouchi

[11] 3,977,105

[45] Aug. 31, 1976

[54] RESERVOIR CAP ASSEMBLY OF A VEHICLE MASTER CYLINDER

[75] Inventor: Kaoru Tsubouchi, Toyota, Japan

[73] Assignee: Aisin Seiki Kabushiki Kaisha, Japan

[22] Filed: Nov. 20, 1974

[21] Appl. No.: 525,655

[30] Foreign Application Priority Data

Dec. 6, 1973 Japan.................. 48-139976[U]

[52] U.S. Cl................................... 40/2.2; 40/311; 40/331; 40/332
[51] Int. Cl.².......................................... G09F 3/02
[58] Field of Search ............ 40/20 A, 20, 330, 331, 40/311, 2.2; 63/26, , 27

[56] References Cited
UNITED STATES PATENTS

| | | | |
|---|---|---|---|
| 1,245,171 | 11/1917 | Auld | 40/20 A |
| 1,263,994 | 4/1918 | Auld | 40/20 A |
| 2,708,802 | 5/1955 | Baker | 40/331 |
| 3,234,678 | 2/1966 | Van Buren | 40/143 |

*Primary Examiner*—Louis G. Mancene
*Assistant Examiner*—Wenceslao J. Contreras

[57] ABSTRACT

A reservoir cap assembly of a vehicle master cylinder includes a cap body detachably mounted on an open end of a reservoir a caution plate on which directions or the like are inscribed, and a rivet having head and leg portions for respectively securing the cap body and the caution plate.

The head portion of the rivet is firstly caulked to a bottom surface of the caution plate, and thereafter the leg portion of the head caulked rivet is fixedly secured in the cap body thereby to tightly attaching the caution plate to the cap body.

1 Claim, 4 Drawing Figures

RESERVOIR CAP ASSEMBLY OF A VEHICLE MASTER CYLINDER

BACKGROUND OF THE INVENTION

1. Field of the Invention

This invention relates generally to a reservoir cap of a vehicle master cylinder, and more particularly to an attachment of a caution plate to a reservoir cap of a motorbicycle master cylinder.

2. Description of the Prior Art

Generally, it is required for motorbicycle master cylinders that a caution plate (directions or the like are mentioned thereupon) must be both securely and ordinarly attached to a reservoir cap in order not to be detachable therefrom, and yet to be orderly positioned thereat as is fine as seen from the outside thereof.

One conventional method for attaching the caution plate to the reservoir cap shows that a caution plate made of a metal material is adhered to a reservoir cap made of a harder plastics material by means of an adhesive. In this method, the caution plate might be detached from the reservoir cap when the adhesive is dissolved due to leakage of the braking fluid in the reservoir.

Another conventional method for attaching the caution metal plate to the reservoir cap made of a harder plastics material shows that two materials (metal and plastics) are formed in one piece at once. In this method, however, due to the different coefficients of expansion between the two materials of metal and plastics, the caution plate might also be detached from the reservoir cap.

SUMMARY OF THE INVENTION

It is, therefore, a main object of the invention to provide an improved reservoir cap of a master cylinder for obviating the above conventional drawbacks.

It is another object of the invention to provide a caution plate orderly and undetachably mounted on a reservoir cap of a master cylinder.

In accordance with one preferred embodiment of the invention, there is provided a rivet between a caution plate and a reservoir cap for fixedly securing the two. A head portion of the rivet is firstly caulked to a bottom surface of the caution plate, and thereafter a leg portion of the rivet is caulked into the reservoir cap. Thus, the caution plate and the reservoir cap can be fixedly secured.

BRIEF DESCRIPTION OF THE DRAWING

Various other objects, features, and attended advantages of the present invention will be more fully appreciated as the same becomes better understood from the following detailed description when considered in connection with the accompanying drawing, in which like reference characters designate like or corresponding parts throughout the several views, and wherein.

DETAILED DESCRIPTION OF THE PREFERRED EMBODIMENTS

Figure 1:
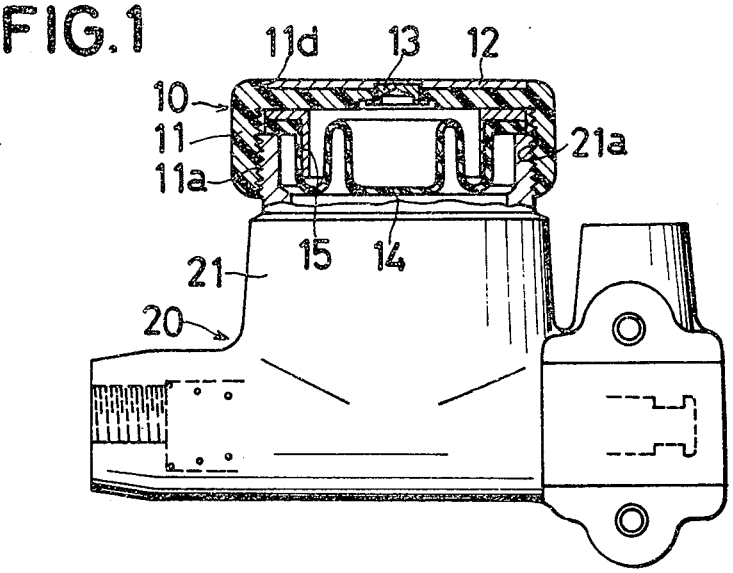
FIG. 1 is a plan view of a master cylinder assembly partly in section.
Figure 2:
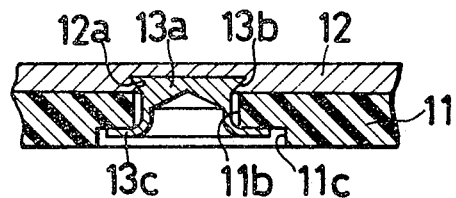
FIG. 2 is an enlarged sectional view of a main part of a reservoir cap shown in FIG. 1.
Figure 3:
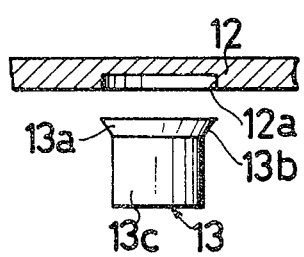
FIG. 3 is a plan view of a rivet before assembling into a reservoir cap of the invention.

Referring now to the drawing, and more particularly to FIGS. 1 through 3, numeral 20 designates a master cylinder assembly of a vehicle hydraulic braking circuit. A reservoir 21 is integrally formed on the master cylinder 20 for supplying braking fluid thereto, and is provided with screw threads 21a at an outer peripheral surface of the open end of the reservoir 21.

A reservoir cap assembly 10 includes a cap body 11 made of a harder plastics material and provided with screw threads 11a at its inner peripheral surface thereof for engaging the screw threads 21a of the reservoir 21 so that the cap body 11 is detachably engaged with the reservoir 21. An outer periphery of a diaphragm 14 supported by a guide member 15 is interposed between the open end of the reservoir 21 and the cap body 11 for preventing the braking fluid in the reservoir 21 from leakage.

A caution plate 12 made of a metal material is attached to a top surface of the cap body 11 through a rivet 13 made of the same metal material as the caution plate 12.

Describing now in detail the attachment between the caution plate 12 and the cap body 11 according to FIGS. 2 and 3, a circular hollow portion 12a is provided in a bottom surface of the caution plate 12 for receiving therein a head portion 13a of the rivet 13. A stepped through-hole 11b, 11c is provided in the cap body 11 for receiving therein a leg portion 13c of the rivet 13.

In assembling the caution plate 12 and the cap body 11, first, a tapered side surface 13b of the head portion 13a of the rivet 13 is caulked into the circular hollow portion 12a of the caution plate 12, and thereafter the leg portion 13c of the rivet 13 which has been caulked to the caution plate 12 at the head portion 13a is now inserted into the stepped through-hole 11b, 11c.

At this time, the caution plate 12 is fitted in a recessed portion 11d (FIG. 1) provided on a top surface of the cap body 11. Therefore, the caution plate 12 is easily positioned at any desired portions of the cap body 11 by providing a through-hole and inserting therein the leg portion 13c of the rivet 13.

Accoringly, with two steps of caulking between the caution plate 12 and the rivet 13 and between cap body 11 and the rivet 13, a secure attachment between the caution plate 12 and the cap body 11 and an orderly positioning therebetween may be both performed at the same time.

Figure 4:
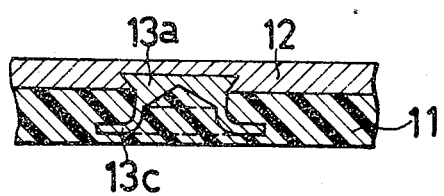
FIG. 4 is a view similar to FIG. 2 but shows another embodiment of the invention.

Referring now to FIG. 4 of the another embodiment, the leg portion 13c of the rivet 13 is outwardly bended in advance. In assembling, therefore, the head portion 13a of the rivet 13 is firstly caulked to the caution plate 12 as is the same to the aforementioned embodiment and thereafter the bended leg portion 13c of the rivet 13 is disposed into the cap body 11 by fitting the caution plate 12 in the recessed portion 11d (FIG. 1) of the cap body 11. In this condition, the plastics material is poured into the cap body 11 thereby thus securing the leg portion 13c of the rivet 13 in the cap body 11.

In the above described two embodiments, only one caution plate is fitted to the reservoir cap, however, the number of caution plates as well as the fitting positions thereof may easily be modified without departing from the spirit or scope of the following claims.

What is claimed is:

1. A cap assembly for a reservoir tank of a master cylinder assembly comprising, a cap member detachably mounted on the reservoir tank and having a recess on the top surface thereof and a hole therethrough extending from the recess therein to the opposed side thereof, a caution plate means disposed in the recess of the cap member and provided with a recessed portion on the bottom side thereof, and rivet means, the head portion of said rivet means being secured in the recessed portion on the bottom surface of said plate and the leg portion of said rivet means passing through the hole in said cap member for securing said plate means in the recess of said cap member.

* * * * *